(12) United States Patent
Chen et al.

(10) Patent No.: US 6,350,521 B1
(45) Date of Patent: Feb. 26, 2002

(54) WEATHERABLE COMPOSITIONS USEFUL AS COATINGS, METHOD, AND ARTICLES COATED THEREWITH

(75) Inventors: Mao Chen, Evansville, IN (US); James Edward Pickett, Schenectady, NY (US); Karen Kueck Webb, Ballston Lake, NY (US); Gregory Ronald Gillette, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/469,703

(22) Filed: Dec. 22, 1999

(51) Int. Cl.[7] .................................................. B32B 27/36
(52) U.S. Cl. ....................................... 428/412; 528/196
(58) Field of Search ................................... 428/412, 447

(56) References Cited

U.S. PATENT DOCUMENTS

| 5,391,795 | A | 2/1995 | Pickett | 556/436 |
|---|---|---|---|---|
| 5,679,820 | A | 10/1997 | Pickett et al. | 556/436 |
| 5,869,185 | A | 2/1999 | Bahr et al. | 428/42 |
| 5,990,188 | A | 11/1999 | Patel et al. | 522/28 |

*Primary Examiner*—Terressa M. Boykin
(74) *Attorney, Agent, or Firm*—S. Bruce Brown; Noreen C. Johnson

(57) ABSTRACT

Thermoplastic substrates subject to color instability and loss of physical properties resulting from exposure to ultraviolet radiation, such as polycarbonate, are coated with a protective coating comprising at least one thermoplastic acrylic polymer such as poly(methyl methacrylate) in combination with two ultraviolet absorbing compounds: a substituted resorcinol such as 4,6-dibenzoylresorcinol and a silylated substituted resorcinol such as 2-(3-triethoxysilylpropyl)-4,6-dibenzoylresorcinol. The silylated substituted resorcinol is used in a minor proportion effective to improve solubility and compatibility of the substituted resorcinol.

23 Claims, No Drawings

WEATHERABLE COMPOSITIONS USEFUL AS COATINGS, METHOD, AND ARTICLES COATED THEREWITH

BACKGROUND OF THE INVENTION

This invention relates to weatherable compositions, and more particularly to weatherable coating compositions for application to thermoplastic substrates.

Various polymeric articles have a problem of long term color instability. This causes yellowing of the polymer, detracting from its transparency and attractiveness. Loss of gloss can also be an undesirable long term phenomenon, as can loss of various physical properties such as impact strength.

Yellowing of polymers is often caused by the action of ultraviolet radiation, which is why such yellowing is frequently designated "photoyellowing". It is particularly vexing when the polymeric article is to be used outdoors, in direct exposure to sunlight; for example, as a roofing material.

Numerous means for suppressing photoyellowing have been employed and proposed. Many of these involve coating the polymeric substrate with a protective coating comprising a thermoplastic resin, typically an acrylic resin such as poly(methyl methacrylate), in combination with an ultraviolet absorbing compound (UVA) and frequently a solvent, which is removed by evaporation as a final step in the coating operation. Among the commercially available UVA's of particular interest are hydroxybenzophenones, hydroxyphenylbenzotriazoles, hydroxyphenyltriazines and cyanoacrylates. It is frequently found, however, that these UVA's do not provide adequate protection against weathering and/or are not compatible with the coating composition at the high loadings required; e.g., about 20–50% by weight based on total solids (resin plus UVA) or 5–10% by weight based on total coating composition including solvent.

Another class of UVA's, found particularly useful in many environments for protection against weathering in outdoor exposure situations, is the polyaroylresorcinols disclosed in U.S. Pat. No. 5,869,185. They are disclosed therein as constituents of coating materials and/or primers, which may contain resins such as acrylic polymers. As with certain of the previously mentioned UVA's, however, the presence of polyaroylresorcinols at the levels required in roofing coatings causes incompatibility, as demonstrated by such disadvantageous properties as low solubility, strong tendency to crystallize, and undesirably high viscosity.

Still another class of UVA's is the silylated diaroylresorcinols. They are described in U.S. Pat. Nos. 5,391,795, 5,679,820 and 5,990,188 as being useful in and compatible with silicone hardcoats and ultraviolet-cured coating compositions comprising acrylic monomers. However, they are relatively expensive to produce and use.

It is of interest, therefore, to develop protective coating compositions containing relatively inexpensive and highly effective UVA's, said compositions being useful to inhibit photoyellowing and other types of degradation in outdoor use in contact with sunlight.

SUMMARY OF THE INVENTION

The present invention is based on the discovery that silylated diaroylresorcinols, in addition to themselves being UVA's, are effective as compatibilizers for non-silylated polyaroylresorcinols in acrylic coating compositions. Thus, the combination of the two types of resorcinols permits the preparation of highly compatible and weatherable coatings. By "weatherable" is meant that ultraviolet degradation as evidenced by photoyellowing is suppressed by use of the coating composition.

One aspect of the invention, therefore, is thermoplastic compositions comprising the following and any reaction products thereof:

at least one thermoplastic acrylic polymer in combination with a minor proportion, effective to improve weatherability, of (A) at least one substituted resorcinol of the formula

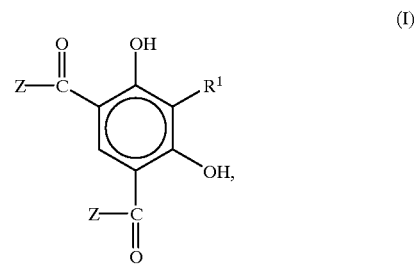

(I)

and (B) at least one silylated substituted resorcinol of the formula

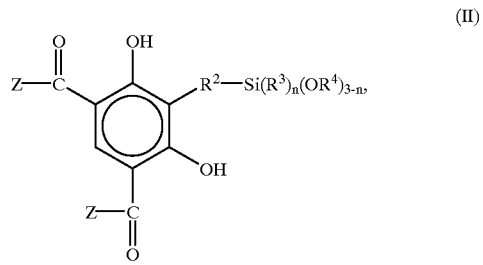

(II)

wherein:
each Z is independently an unsubstituted or substituted aromatic radical,
$R^1$ is hydrogen, a $C_{1-10}$ alkyl radical or Z—C(O)—,
$R^2$ is a divalent $C_{1-10}$ aliphatic hydrocarbon radical,
each $R^3$ and $R^4$ is independently a $C_{1-12}$ alkyl radical, and
n is 0–3;
component B being present in a minor proportion effective to improve solubility and compatibility of component A.

Another aspect of the invention is articles, particularly useful in roofing and other outdoor exposure situations, comprising a thermoplastic substrate and a protective coating thereon, said coating being as described hereinabove.

DETAILED DESCRIPTION; PREFERRED EMBODIMENTS

It is immaterial from the standpoint of the invention, and not entirely certain in any event, whether any chemical reaction takes place between the various components as defined hereinafter. Thus, the invention includes simple physical mixtures of said components and also reaction products thereof.

At least one thermoplastic acrylic polymer is one of the constituents of the compositions of the invention. By "acrylic polymer" is meant an addition polymer of at least one monomer derived from acrylic acid or a functional derivative thereof; i.e., an ester, amide, nitrile or the like. Illustrative monomers include acrylic acid, ethyl acrylate, methyl methacrylate, acrylamide and acrylonitrile. The preferred acrylic polymers for many purposes are poly(alkyl acrylates) and poly(alkyl methacrylates), especially poly (methyl methacrylate).

While the use of curable acrylic polymers is within the scope of the invention, it is generally preferred to employ a simple, preformed thermoplastic acrylic polymer which is not capable of further curing. Thus, homo- and copolymers of methyl methacrylate are particularly useful, with the homopolymer, hereinafter sometimes designated "PMMA", being most preferred.

Component A, the substituted resorcinol of formula I, is usually the predominant UVA according to the invention. The Z value therein may be any unsubstituted or substituted aromatic radical, illustrations being phenyl, p-chlorophenyl, p-tolyl, 1-naphthyl and 2-naphthyl; phenyl is generally preferred. $R^1$ is hydrogen (preferably) or alkyl or Z—C (O)—wherein Z is as previously defined. The particularly preferred compound for use as component A is 4,6-dibenzoylresorcinol.

Component B is a silylated substituted resorcinol similar in molecular structure, other than the presence of the silylalkyl group, to component A. The $R^2$ radical may be, for example, ethylene, trimethylene, tetramethylene, pentylene or neopentylene; trimethylene is preferred. The value of n may be from 0 to 3 and is usually 0. Both $R^3$ and $R^4$ may be, for example, methyl, ethyl, 1-propyl, 2-propyl, 1-butyl, 2-methyl-1-propyl, 1-pentyl, 1-octyl, 2-ethylhexyl, 1-decyl or 1-dodecyl, with methyl and ethyl generally being preferred. The most preferred compound of formula II is 2-(3-triethoxysilylpropyl)-4,6-dibenzoylresorcinol.

It is usually preferred to incorporate a solvent in the compositions of the invention. Any solvent effective to dissolve components A and B and the thermoplastic acrylic polymer, and which is non-aggressive to any substrate to which the coating composition is to be applied, may be employed. Suitable solvents may include alcohols, hydroxy ethers, mixtures of the foregoing with water, liquid aliphatic and alicyclic hydrocarbons and chlorofluorocarbons. A frequently preferred solvent is 1-methoxy-2-propanol.

The thermoplastic substrates present in the articles of this invention may be of any suitable thermoplastic material. Examples are polycarbonates, polyesters, polyamides, polyimides and addition polymers including acrylic polymers and polystyrenes (e.g., acrylonitrile-styrene, acrylonitrile-butadiene-styrene and acrylonitrile-styrene-alkyl acrylate copolymers), polyvinyl chloride, polyethylene and polypropylene. Polycarbonates are often preferred, with bisphenol A polycarbonates being most preferred; i.e., polycarbonates derived from 2,2-bis(4-hydroxy-phenyl)propane.

The proportions of components A and B in the compositions of the invention are adjusted for effectiveness to improve weatherability of the coating composition and the underlying substrate, and to improve solubility and compatibility of component A. In general, it is preferred to employ component A as the principal weatherability improving constituent and component B primarily as a compatibilizer, although component B also typically improves weatherability, since the relative cost of component A is substantially lower than that of component B. Moreover, two bases for proportions may be appropriate if the coating composition is prepared and applied in solution.

With this in mind, the proportion of UVA (one or more) based on total solids is most often about 20–50% and preferably about 25–40% by weight. Based on total solution in which it may be prepared, the proportion of UVA is an amount effective to improve weatherability and is typically about 4–12%, preferably about 5–10% and the proportion of acrylic resin about 5–30%, preferably about 10–25%.

As between components A and B, the proportion of component B is an amount effective to improve solubility and compatibility of component A with the acrylic resin and, if present, solvent. This is most often in the range of about 10–50%, preferably about 20–40% of component B by weight of combined UVA's.

The compositions of this invention may be prepared by simple blending of the constituents thereof; either acrylic resin and UVA's, or those two in combination with solvent. For preparation of the coated articles of the invention, the coating composition may be applied to the substrate by conventional operations which will depend to some extent on whether a solvent is or is not employed. Thus, such application methods as brushing, spraying, flow coating, dip coating, drawing down and coextrusion may be employed. The thickness of the coating composition on said articles may vary over a wide range, typically in the range of about 1–100 microns.

The invention is illustrated by the following examples. All parts are by weight.

EXAMPLE 1

Coating compositions were prepared in solution from 6.8 parts of one or more of 4,6-dibenzoylresorcinol as component A and its silylated analog 2-(3-triethoxysilylpropyl)-4,6-dibenzoylresorcinol as component B, 15.7 parts of a commercially available PMMA and 77.5 parts of 1-methoxy-2-propanol as solvent. They were subjectively evaluated for compatibility by observation of the homogeneity of the solutions, and the results are given in Table I, with proportions of components A and B being given based on total solids content and, in parentheses, percentages based on the total of UVA components.

TABLE I

| Entry | Component A, % | Component B, % | Compatibility |
|---|---|---|---|
| 1 | 30 (100) | 0 | Crystallization |
| 2 | 20 (100) | 0 | Borderline |
| 3 | 17 (100) | 0 | Clear |
| 4 | 24 (80) | 6 (20) | Clear |

It can be seen that the highest proportion of component A that produces a clear solution contains it at the 17% level. By contrast, addition of component B, the silylated compound, in the amount of 20% of total UVA permits utilization of a UVA level of 24% component A.

EXAMPLE 2

Bisphenol A polycarbonate panels, 15.2 centimeters (cm)×30.5 cm×3.18 millimeters (mm), were coated by drawing down with coating compositions in solution identical or similar to those of Example 1 and were then dried for 15 minutes at 120° C. Coatings with a thickness of 5–6 microns ($\mu$) were produced.

The panels were weathered in a QUVB (FS-40) accelerated weathering tester, with cycles of 8 hours light (70° C.) followed by 4 hours dark (50° C.). The results are given in Table II in terms of yellowness index (YI) after 2300 hours, with "DBR" representing 4,6-dibenzoylresorcinol and "SDBR" representing 2-(3-triethoxysilylpropyl)-4,6-dibenzoylresorcinol). Compatibility was judged by clarity of the coating solution and/or appearance of the coated article after cure, and coating appearance was evaluated visually. When a mixture of UVA's was employed, percentage levels based on total UVA are given in parentheses. Comparison is made with panels coated with similar compositions containing as UVA's the commercially available hydroxybenzophenone and hydroxyphenyltriazine available under the trade name CYASORB 531 and TINUVIN 400, respectively.

TABLE II

| Entry | UVA (% of total UVA) | Compatibility | YI | Coating appearance |
|---|---|---|---|---|
| 1 | Hydroxy-benzophenone | Good | 11.7 | Delaminated |
| 2 | Hydroxy-phenyltriazine | Hazy, tacky | — | — |
| 3 | DBR (100) | Fair | — | — |
| 4 | SDBR (100) | Good | 3.3 | Intact |
| 5 | DBR (70), SDBR (30) | Good | 2.9 | Intact |

It is apparent that the composition of the invention (Entry 5) is superior in weatherability and compatibility to Entries 1–3 and comparable to Entry 4, in which a large proportion of the more expensive SDBR was used as the only UVA.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition comprising the following and any reaction products thereof:

at least one thermoplastic acrylic polymer in combination with a minor proportion, effective to improve weatherability, of (A) at least one substituted resorcinol of the formula (I)

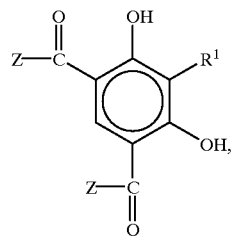

and (B) at least one silylated substituted resorcinol of the formula (II)

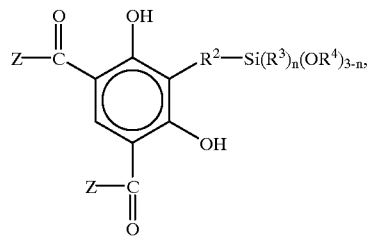

wherein:
each Z is independently an unsubstituted or substituted aromatic radical,
$R^1$ is hydrogen, a $C_{1-10}$ alkyl radical or Z—C(O)—,
$R^2$ is a divalent $C_{1-10}$ aliphatic hydrocarbon radical,
each $R^3$ and $R^4$ is independently a $C_{1-12}$ alkyl radical, and
n is 0–3;
component B being present in a minor proportion effective to improve solubility and compatibility of component A.

2. The composition according to claim 1 wherein the acrylic polymer is a poly(alkyl acrylate) or poly(alkyl methacrylate).

3. The composition according to claim 2 wherein the acrylic polymer is poly(methyl methacrylate).

4. The composition according to claim 1 wherein each Z is phenyl.

5. The composition according to claim 4 wherein $R^1$ is hydrogen.

6. The composition according to claim 4 wherein $R^2$ is trimethylene.

7. The composition according to claim 6 wherein n is 0.

8. The composition according to claim 7 wherein $R^4$ is methyl or ethyl.

9. The composition according to claim 1 further comprising a solvent.

10. The composition according to claim 9 wherein the solvent is an alcohol, hydroxy ether, mixture of an alcohol or hydroxy ether with water, liquid aliphatic or alicyclic hydrocarbon or chlorofluorocarbon.

11. The composition according to claim 10 wherein the solvent is 1-methoxy-2-propanol.

12. The composition according to claim 1 wherein the combination of components A and B is present in the amount of about 25–40% by weight based on total solids, and component B is present in the amount of about 20–40% by weight of combined components A and B.

13. A thermoplastic composition comprising the following and any reaction products thereof: poly(methyl methacrylate) in combination with (A) 4,6-dibenzoylresorcinol and (B) 2-(3-triethoxysilylpropyl)-4,6-dibenzoylresorcinol; components A and B combined being present in the amount of about 25–40% by weight based on total solids and component B in the amount of about 20–40% by weight of combined components A and B.

14. An article comprising a thermoplastic substrate and a protective coating thereon, said coating comprising the following and any reaction products thereof:

at least one thermoplastic acrylic polymer in combination with a minor proportion, effective to improve weatherability, of (A) at least one substituted resorcinol of the formula (I)

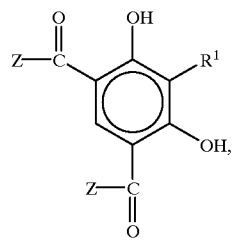

and
(B) at least one silylated substituted resorcinol of the formula (II)

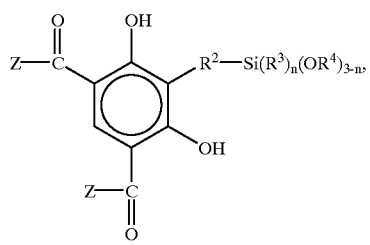

wherein:
each Z is independently an unsubstituted or substituted aromatic radical,
$R^1$ is hydrogen, a $C_{1-10}$ alkyl radical or Z—C(O)—,
$R^2$ is a divalent $C_{1-10}$ aliphatic hydrocarbon radical,
each $R^3$ and $R^4$ is independently a $C_{1-12}$ alkyl radical, and
n is 0–3;
component B being present in a minor proportion effective to improve solubility and compatibility of component A.

15. The article according to claim 14 wherein the thermoplastic substrate is polycarbonate.

16. The article according to claim 15 wherein the acrylic polymer is poly(methyl methacrylate).

17. The article according to claim 15 wherein each Z is phenyl and $R^1$ is hydrogen.

18. The article according to claim 17 wherein $R^2$ is trimethylene and n is 0.

19. The article according to claim 18 wherein $R^4$ is methyl or ethyl.

20. The article according to claim 15 wherein the combination of components A and B is present in the amount of about 25–40% by weight based on total solids, and component B is present in the amount of about 20–40% by weight of combined components A and B.

21. An article comprising a bisphenol A polycarbonate substrate and a protective coating thereon, said coating comprising the following and any reaction products thereof: poly(methyl methacrylate) in combination with (A) 4,6-dibenzoylresorcinol and (B) 2-(3-triethoxysilylpropyl)-4,6-dibenzoylresorcinol; components A and B combined being present in the amount of about 25–40% by weight based on total solids and component B in the amount of about 20–40% by weight of combined components A and B.

22. A method to improve the weatherability of an article comprising a thermoplastic substrate which comprises applying a protective coating thereon, said coating comprising the following and any reaction products thereof:
at least one thermoplastic acrylic polymer in combination with a minor proportion, effective to improve weatherability, of
(A) at least one substituted resorcinol of the formula (I)

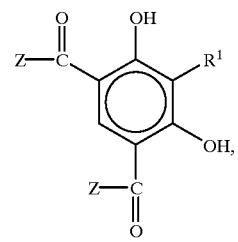

and
(B) at least one silylated substituted resorcinol of the formula (II)

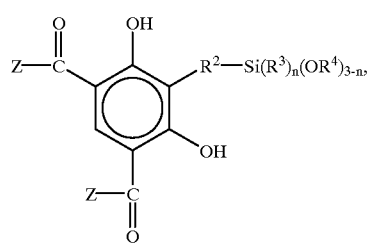

wherein:
each Z is independently an unsubstituted or substituted aromatic radical,
$R^1$ is hydrogen, a $C_{1-10}$ alkyl radical or Z—C(O)—,
$R^2$ is a divalent $C_{1-10}$ aliphatic hydrocarbon radical,
each $R^3$ and $R^4$ is independently a $C_{1-12}$ alkyl radical, and
n is 0–3;
component B being present in a minor proportion effective to improve solubility and compatibility of component A.

23. A method to improve the weatherability of an article comprising a bisphenol A polycarbonate substrate which comprises applying a protective coating thereon, said coating comprising the following and any reaction products thereof: poly(methyl methacrylate) in combination with (A) 4,6-dibenzoylresorcinol and (B) 2-(3-triethoxysilylpropyl)-4,6-dibenzoylresorcinol; components A and B combined being present in the amount of about 25–40% by weight based on total solids and component B in the amount of about 20–40% by weight of combined components A and B.

* * * * *